(12) United States Patent
Chung et al.

(10) Patent No.: US 8,154,674 B2
(45) Date of Patent: Apr. 10, 2012

(54) LIQUID CRYSTAL DISPLAY, ARRAY SUBSTRATE AND MOTHER GLASS THEREOF

(75) Inventors: Te-Chen Chung, Kun Shan (CN); Chia-Te Liao, Kun Shan (CN)

(73) Assignee: Infovision Optoelectronics (Kunshan) Co., Ltd., Kunshan (CN)

( * ) Notice: Subject to any disclaimer, the term of this patent is extended or adjusted under 35 U.S.C. 154(b) by 857 days.

(21) Appl. No.: 12/146,629

(22) Filed: Jun. 26, 2008

(65) Prior Publication Data

US 2009/0244420 A1 Oct. 1, 2009

(30) Foreign Application Priority Data

Mar. 28, 2008 (CN) .......................... 2008 1 0090366

(51) Int. Cl.
G02F 1/1333 (2006.01)
G02F 1/13 (2006.01)
(52) U.S. Cl. ............................. 349/40; 349/54; 349/192
(58) Field of Classification Search .................... 349/40, 349/149, 54, 55, 192
See application file for complete search history.

(56) References Cited

U.S. PATENT DOCUMENTS

| | | | | | |
|---|---|---|---|---|---|
| 5,760,855 | A | * | 6/1998 | Nakase et al. | 349/40 |
| 6,043,971 | A | * | 3/2000 | Song et al. | 361/111 |
| 6,184,948 | B1 | * | 2/2001 | Lee | 349/54 |
| 6,515,723 | B1 | * | 2/2003 | Suzuki | 349/73 |
| 6,577,367 | B2 | * | 6/2003 | Kim | 349/139 |
| 2002/0063843 | A1 | * | 5/2002 | Yu et al. | 349/187 |
| 2004/0113149 | A1 | * | 6/2004 | Kim | 257/59 |

\* cited by examiner

*Primary Examiner* — Hoan C Nguyen

(74) *Attorney, Agent, or Firm* — Perkins Coie LLP; Aaron Wininger

(57) ABSTRACT

An array substrate for a liquid crystal display, a liquid crystal display comprising the array substrate, and a mother glass from which the array substrate is cut off, are provided. The array substrate comprises a plurality of scan lines; a plurality of data lines crossing with the plurality of scan lines; and a common electrode bus, wherein each of the array substrate further comprises a shorting bar which transmits the same signal as a signal that the common electrode bus transmits during operation of the corresponding liquid crystal display. The invention both improves the utilization of a mother glass and allows testing the data lines and/or scan lines with shorting bars.

19 Claims, 11 Drawing Sheets

LIQUID CRYSTAL DISPLAY, ARRAY SUBSTRATE AND MOTHER GLASS THEREOF

TECHNICAL FIELD

The present invention relates to an array substrate of a liquid crystal display, and in particular, to an array substrate of a liquid crystal display that can improve the utilization of glass substrate. The present invention further relates to a liquid crystal display using the array substrate and a mother glass for cutting into the array substrates.

BACKGROUND

At present, various flat panel displays (FPDs) have been developed, such as liquid crystal displays (LCDs), organic electroluminescence displays (OLEDs) and plasma display panels (PDPs). For each type of the displays, signal lines, for example scan lines and data lines, need to be tested during manufacture of the panels in order to ensure the normal operation of an FPD.

FIG. 1 is a plan view showing a conventional arrangement of a plurality of array substrates for LCD in one mother glass. Taking a fifth-generation mother glass as an example, the conventional solution typically allows 15 array substrates for 15.4-inch LCD arranged in and subsequently cut from the mother glass. FIG. 1 also shows the positions of shorting bars 10, 11, 15 and 16 for testing the scan lines and data lines. Test signals are transmitted to the shorting bars 10 and 11 from external pins within a region 7, and also transmitted to the shorting bars 15 and 16 via test signal transmission lines 15a and 16a.

FIG. 2 is an enlarged view of the region A in FIG. 1. An array substrate 19 for LCD comprises a display region 18, a plurality of scan lines and a plurality of data lines arranged crossing with the scan lines. For the sake of clarity, only two scan lines 12a, 12b and two data lines 13a, 13b are illustrated in FIG. 2. The array substrate further comprises a common electrode bus 17 and outer lead bonding (OLB) modules 14a, 14b positioned outside the periphery of the display region 18. The shorting bars 10 and 11 are positioned on the mother glass and outside the array substrate 19, in specific, to the left side of the array substrate 19 as shown in FIG. 2. In a sequence of the scan lines of the array substrate 19, the 1st, 3rd, 5th . . . scan lines counted from one end of the sequence (hereinafter referred to as "odd indexed scan line(s)" and denoted with a reference number appended with a letter "a", such as the scan line 12a in FIG. 2) each have one end thereof connected to the shorting bar 10, while the 2nd, 4th, 6th . . . scan lines counted from the end of the sequence (hereinafter referred to as "even indexed scan line(s)" and denoted with a reference number appended with a letter "b", such as the scan line 12b in FIG. 2) each have one end thereof connected to the shorting bar 11. The scan lines 12a and 12b are tested by using scanning test signals inputted from the external pins in the region 7 shown in FIG. 1 through the shorting bars 10 and 11. The shorting bars 15 and 16 are positioned outside the array substrate 19 and, in specific, to the lower side of the array substrate 19 as shown in FIG. 2. In a sequence of the data lines of the array substrate 19, the 1st, 3rd, 5th . . . data lines counted from one end of the sequence (hereinafter referred to as "odd indexed data line(s)" and denoted with a reference number appended with a letter "a", such as the data line 13a in FIG. 2) each have one end thereof connected to the shorting bar 15, and the 2nd, 4th, 6th . . . data lines counted from the end of the sequence (hereinafter referred to as "even indexed data line(s)" and denoted with a reference number appended with a letter "b", such as the data line 13b in FIG. 2) each have one end thereof connected to the shorting bar 16. The data lines 13a and 13b are tested by using data test signals inputted from the external pins in the region 7 shown in FIG. 1 through test signal transmission lines 15a, 16a and the shorting bars 15, 16.

For the structure shown in FIG. 2, after completing testing for the scan lines and data lines of the array substrate 19 by using the shorting bars 10, 11, 15 and 16, the shorting bars 10, 11, 15 and 16 will be cut off along a cutting line 20 shown in FIG. 2, leaving the array substrate 19 which will be assembled with a color filter substrate to obtain a liquid crystal display. In the structure described above with reference to FIGS. 1 and 2, however, the shorting bars 15 and 16 take some space and cause a low utilization of the mother glass.

SUMMARY OF THE INVENTION

Embodiments of the present invention provide an array substrate for a liquid crystal display that both improves the utilization of a mother glass and allows testing the data lines and/or scan lines with shorting bars. Embodiments of the present invention also relate to a liquid crystal display using the array substrate and a mother glass for cutting into the array substrates.

According to an embodiment of the invention, an array substrate of a liquid crystal display is provided comprising: a plurality of scan lines; a plurality of data lines crossing with the plurality of scan lines; and a common electrode bus, wherein the array substrate further comprises a shorting bar which transmits the same signal as a signal that the common electrode bus transmits during operation of the liquid crystal display.

Embodiments of the invention also provide a liquid crystal display using the array substrate and a mother glass for cutting into the array substrates.

In an embodiment of the invention, the mother glass is used more efficiently and the data lines and/or scan lines can be tested with shorting bars conveniently.

BRIEF DESCRIPTION OF THE DRAWINGS

From the following detailed description to the embodiments, accompanying with the drawings, the present invention will be more apparent. In the drawings.

DETAILED DESCRIPTION OF EMBODIMENTS

Figure 1:
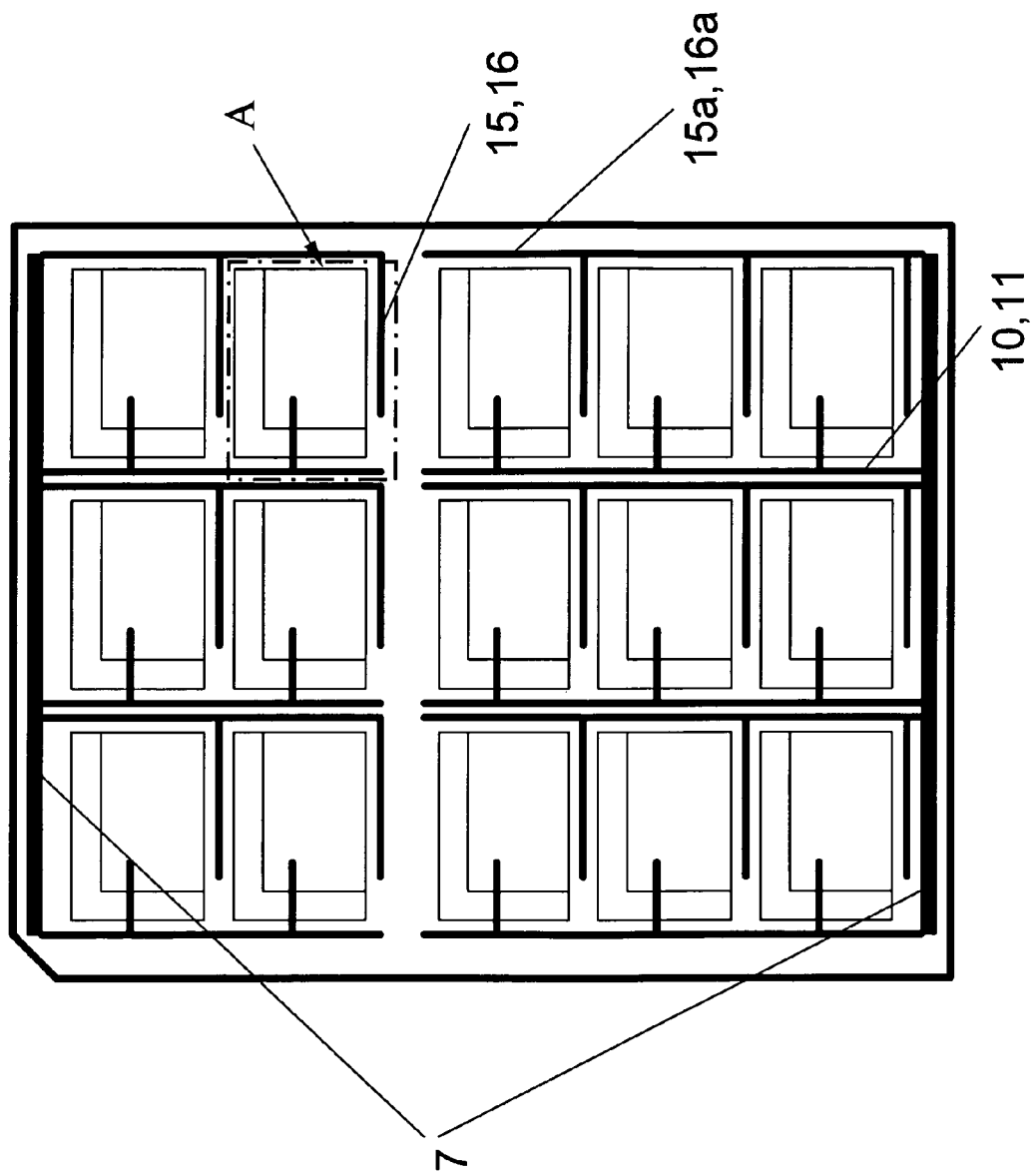
FIG. 1 is a plan view showing a conventional arrangement of a plurality of array substrates for LCD in one mother glass.

As described above, in the structure of FIGS. 1 and 2, the shorting bars 15 and 16 take some space and cause a low utilization of the mother glass. A solution to this problem will be discussed in the following. Moreover, because the array substrates have mutually similar configuration structures, like elements on different array substrates will be denoted with uniform reference numbers. This applies also to the present invention described later on.

Figure 3:
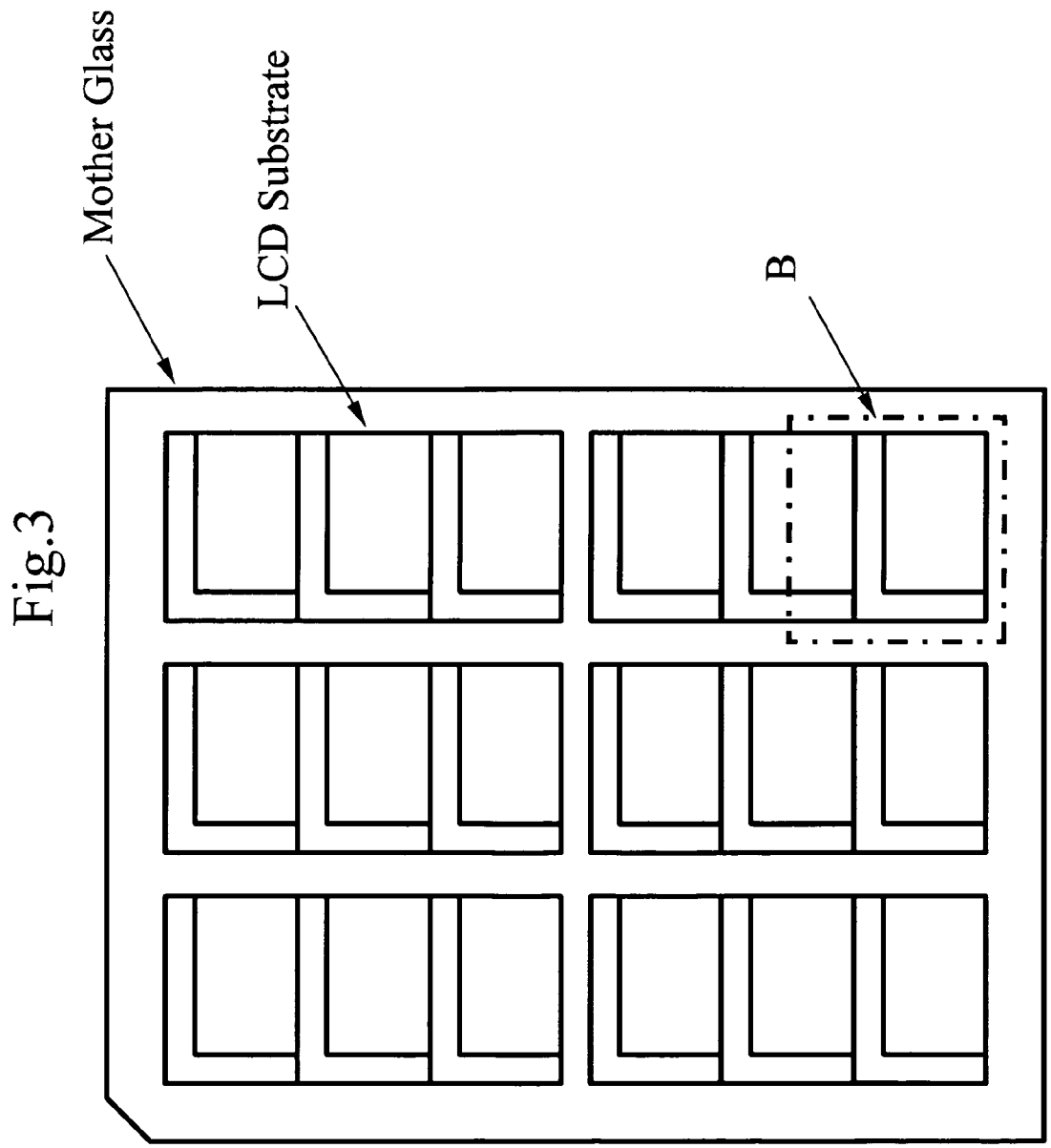
FIG. 3 is a plan view showing an improved arrangement of a plurality of array substrates of LCD in one mother glass.

FIG. 3 is a plan view showing an improved arrangement of a plurality of array substrates of LCD in one mother glass. The plurality of array substrates may be arranged in the mother glass either in a vertical configuration or in a horizontal configuration, and FIG. 3 shows a structure in the vertical configuration. As shown in FIG. 3, the array substrates without the shorting bars 15 and 16 in the mother glass are divided into six groups each of which consists of three array substrates abutting against each other. With such arrangement, 18 array substrates for 15.4-inch LCD can be arranged in the mother glass having the same dimension with that of FIG. 1, and utilization of the mother glass is improved.

Figure 4:
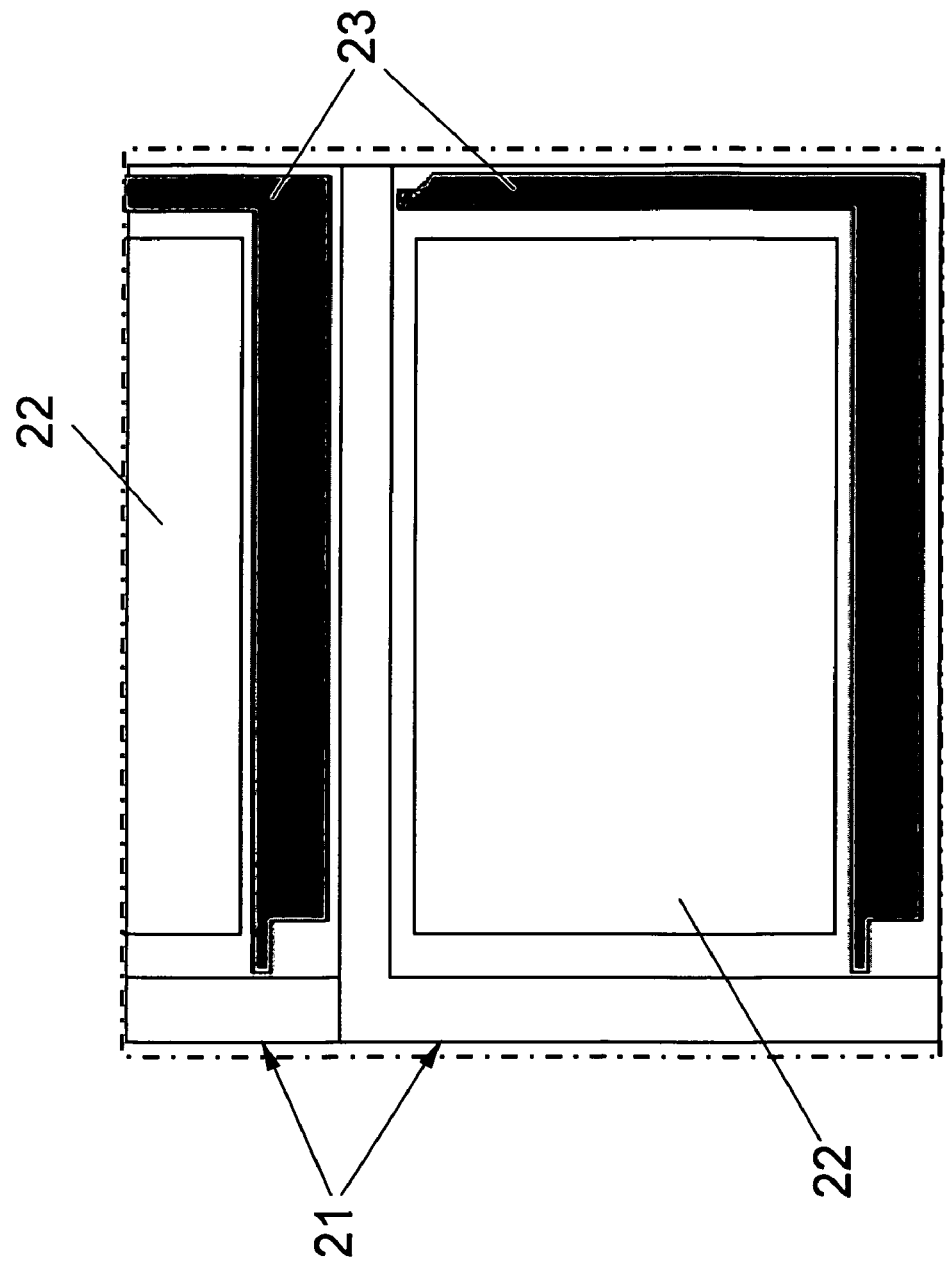
FIG. 4 is an enlarged view of the region B in FIG. 3 showing a region in which two array substrates in a group abut against each other.

FIG. 4 is an enlarged view of the region B in FIG. 3 showing a region in which two array substrates in a group abut against each other. As shown in FIG. 4, each of the array substrates 21 comprises a display region 22 and a common electrode bus 23 provided outside a periphery of the display region 22. In order to arrange more array substrates in the mother glass, the vertically adjacent array substrates in each group have to abut against each other. Furthermore, the region outside the periphery of each array substrate is provided with the common electrode bus, which can be 2 mm in width, for providing signals to a storage capacitor electrode within the display region (note the storage capacitor electrode is well known in the art, and therefore is not shown in the drawings and will not described in detail). Hence sufficient space is not available for providing the shorting bars for testing the data lines similar to the shorting bars 15, 16 in FIG. 2.

Figure 5:
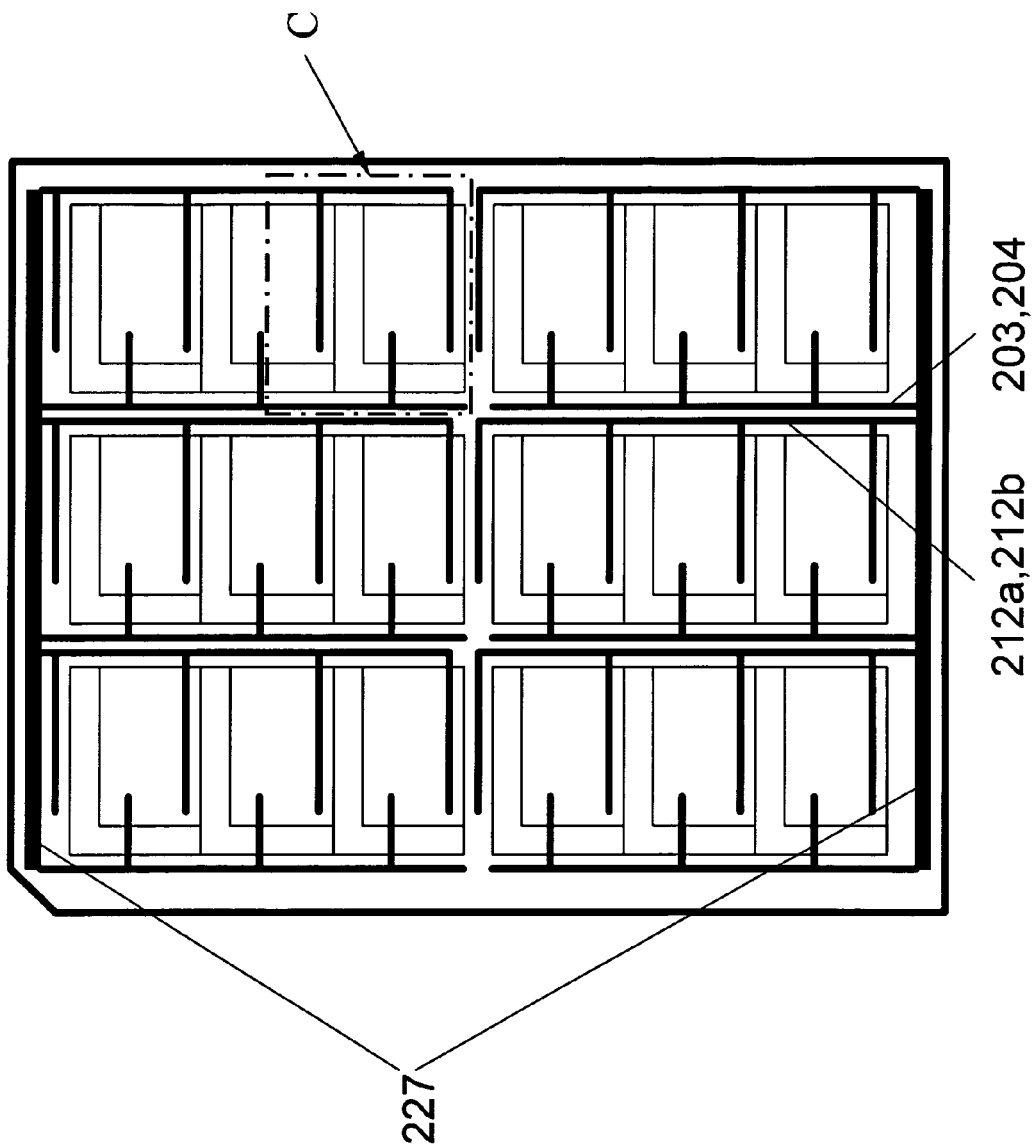
FIG. 5 is a plan view of arrangement of a plurality of array substrates of LCD in one mother glass according to an embodiment of the invention.

FIG. 5 is a plan view of arrangement of a plurality of array substrates of LCD in one mother glass according to an embodiment of the invention. As shown in FIG. 5, the array substrates in the mother glass are divided into 6 groups each of which comprises three array substrates abutting against each other. In other words, in each group, a lower edge of an upper array substrate is also an upper edge of a lower array substrate adjacent thereto, so as to make efficient use of the space in the mother glass.

Figure 6:
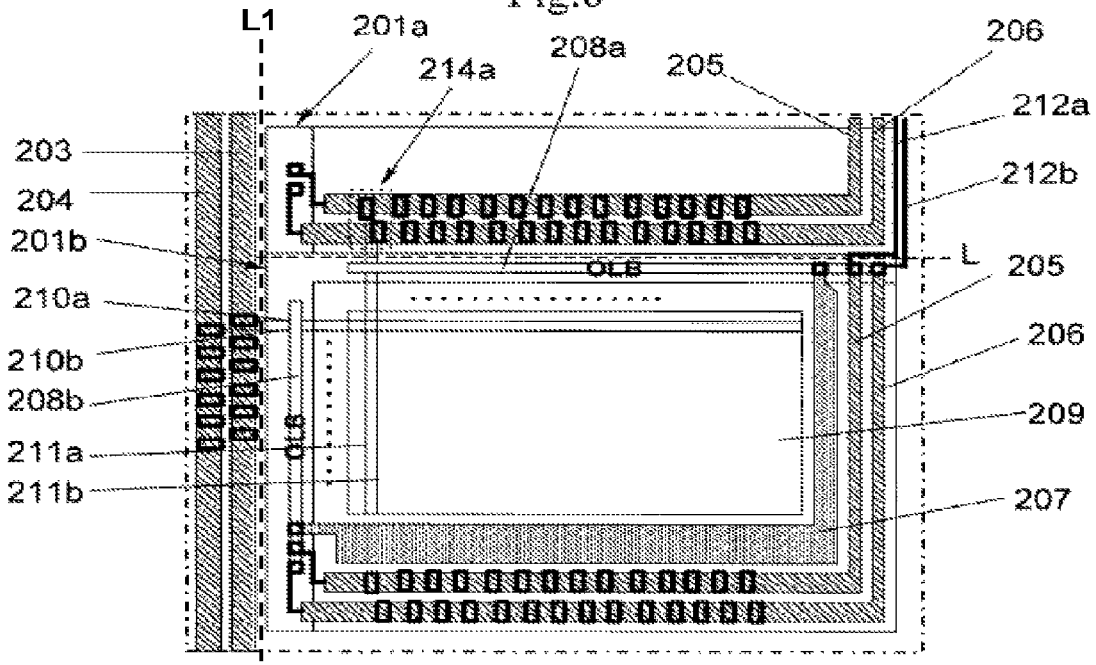
FIG. 6 is an enlarged view of the region C in FIG. 5 showing the region in which two array substrates in a group abutting against each other.

FIG. 6 is an enlarged view of the region C in FIG. 5 showing the region in which two array substrates in a group abutting against each other. In FIG. 6, reference numbers 201a and 201b denote two adjacent array substrates. The array substrates 201a and 201b have substantially the same structure and therefore the description will be directed only to the array substrate 201b in the following. The array substrate 201b comprises a display region 209 and a non-display region outside the display region 209. The array substrate 201b also comprises a plurality of data lines and a plurality of scan lines crossing with each other in the display region 209. For the sake of clarity, only two data lines 211a, 211b and two scan lines 210a, 210b are illustrated in FIG. 6. The array substrate 201b is further provided with a common electrode bus 207 and outer lead bonding (OLB) modules 208a, 208b. The usage and operation manner of the common electrode bus 207 and the OLB modules 208a, 208b are commonly known for those of ordinary skill in the art, and will not be described in detail.

In the embodiment of FIGS. 5 and 6, the array substrates 201a and 201b are further provided with shorting bars 205 and 206 in the respective non-display region. The odd indexed data line 211a of the array substrate 201b has one end thereof connected to the shorting bar 205, and the even indexed data line 211b of the array substrate 201b has one end thereof connected to the shorting bar 206. Moreover, shorting bars 203 and 204 are provided on the mother glass at a portion outside the array substrates 201a and 201b. The odd indexed scan line 210a of the array substrate 201b has one end thereof connected to the shorting bar 203, and the even indexed scan line 210b of the array substrate 201b has one end thereof connected to the shorting bar 204. The mother glass as shown in FIG. 6 is also provided with test signal transmission lines 212a and 212b. The test signal transmission line 212a has one end connected to the shorting bar 205 and the other end connected to an external pin in a region 227 of the mother glass (see also FIG. 5). The test signal transmission line 212b has one end connected to the shorting bar 206 and the other end connected to an external pin in the region 227. The broken line L indicates a cutting line along which an assembled liquid crystal display is cut.

As shown in FIG. 6, scan test signals are transmitted to the odd and even indexed scan lines via the shorting bars 203 and 204. Data test signals are transmitted to the test signal transmission lines 212a and 212b via the external pins, and further to the shorting bars 205 and 206 of the array substrates. As shown in FIG. 6, the shorting bars 205 and 206 positioned in the array substrate 201a are utilized in testing the odd and even indexed data lines of the array substrate 201b.

Figure 2:
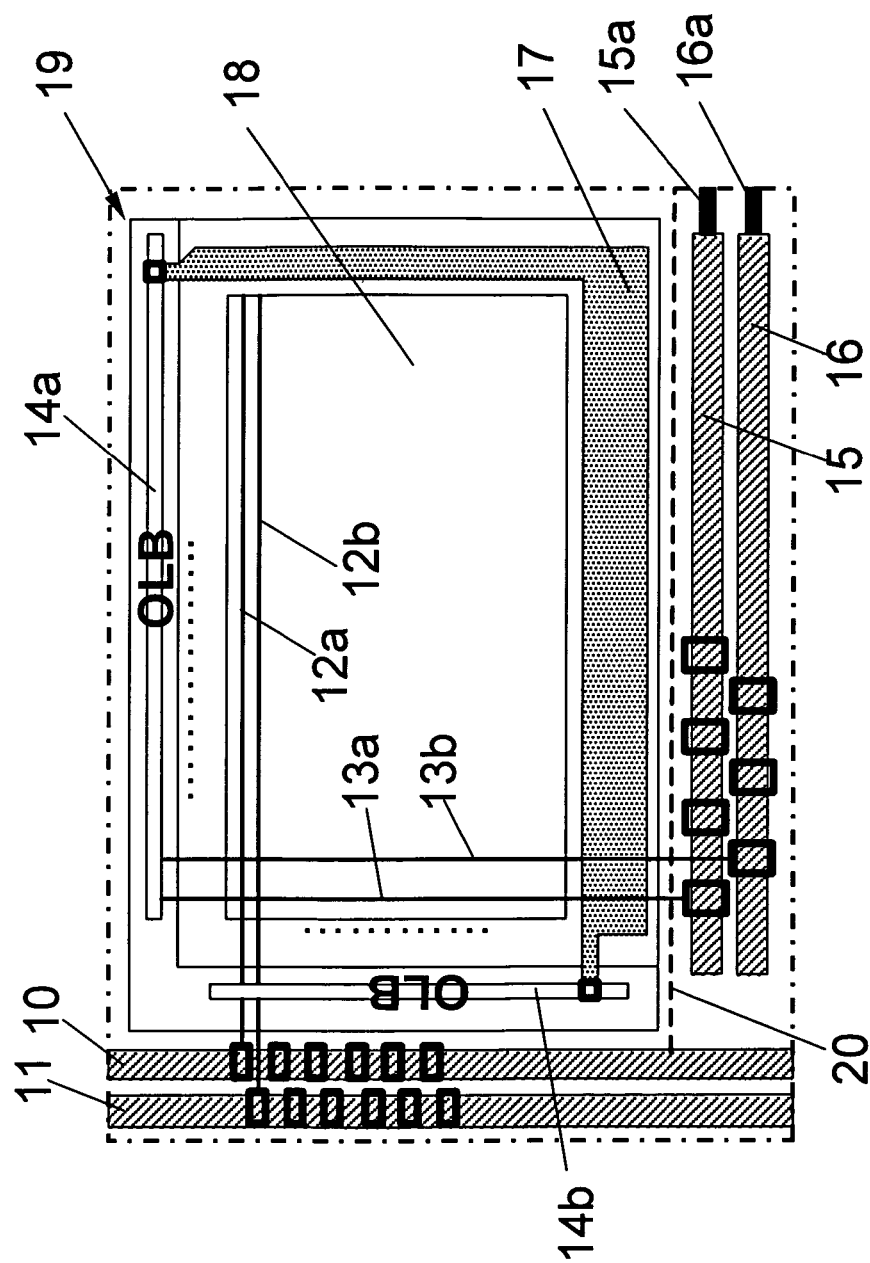
FIG. 2 is an enlarged view of the region A in FIG. 1.

In comparison with the conventional array substrate 19 as shown in FIG. 2, the common electrode bus 207 is relatively thinner in an embodiment of the invention, and the space saved in this way is provided with the two shorting bars 205 and 206, and the data lines of the array substrate 201b are tested by using the shorting bars 205 and 206 positioned in the array substrate 201a. As an example, a conventional common electrode bus is typically about 2 mm in width. With the common electrode bus thinned down to about 1 mm in width, the space saved can be provided with two shorting bars each having a width of about 0.5 mm. With such structure, both the common electrode bus and a plurality of shorting bars can be provided without increasing the area of the non-display region.

In the embodiment shown in FIGS. 5 and 6, the shorting bars 203 and 204 are used to test the scan lines of the three array substrates in the group, and the shorting bars 205 and 206 are used to test the data lines of each array substrate in the group. The shorting bars 205 and 206 are respectively connected with the test signal transmission lines 212a and 201b, therefore the data lines of each array substrate in the group can be tested by using test signals transmitted from the external pins.

The foregoing description is directed to the case in which the data lines are tested using the shorting bars of the array substrate. It is apparent, however, that the invention also applies in testing the scan lines. The array substrates illustrated in the embodiment are shown arranged in a vertical configuration. However, the invention is also applicable to a horizontal configuration. Similar to the arrangement shown in FIGS. 3 and 5, in the horizontal configuration, array substrates in a mother glass are divided into a plurality of groups, and the array substrates in a group that are adjacent in a direction of right-and-left are abutting against each other in an embodiment.

In the embodiment, the shorting bars 205 and 206 positioned in the array substrate 201a are used to test the data lines of the array substrate 201b such that after the array substrate 201b and the corresponding color filter substrate are bonded and cut along the cutting line L, the shorting bars 205 and 206 are no longer connected with the data lines of the array substrate 201b. Therefore, according to the embodiment, common voltage signals inputted to the shorting bars 205 and 206 as described below will not interfere with the data signals in the data lines.

Figure 7:
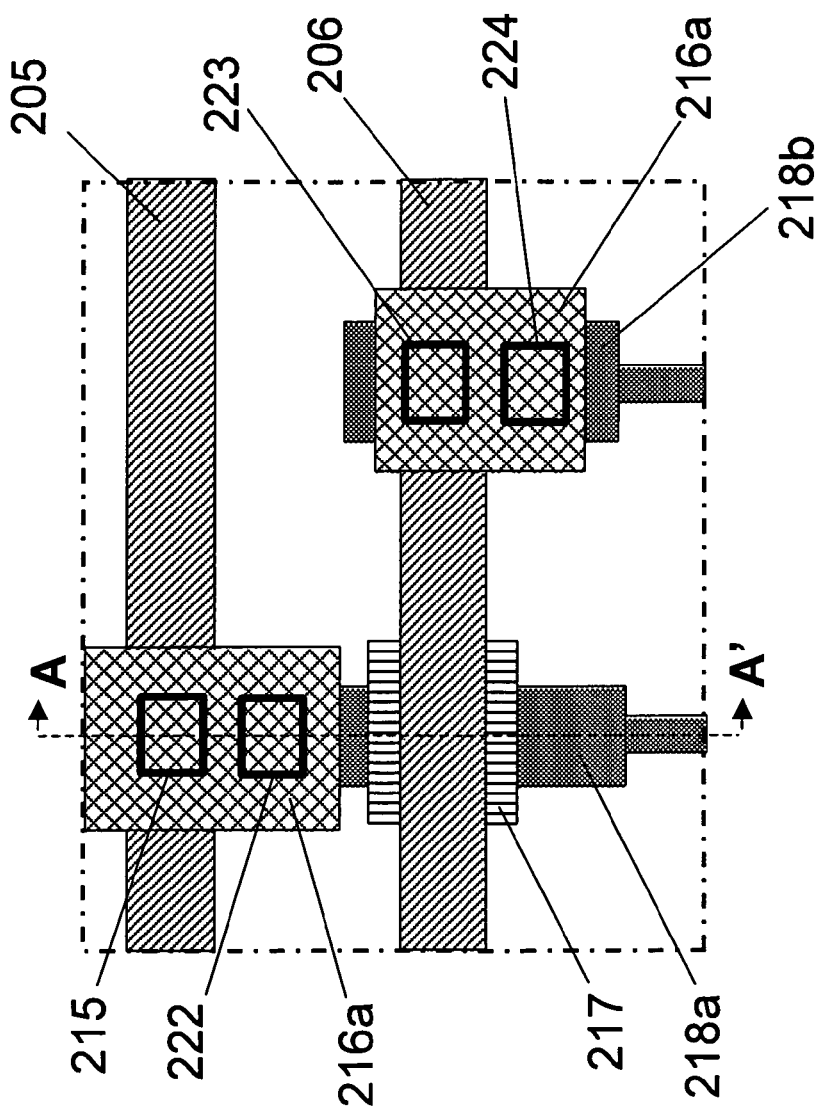
FIG. 7 is an enlarged view showing the region 214a of the array substrate 201a in FIG. 6.
Figure 8:
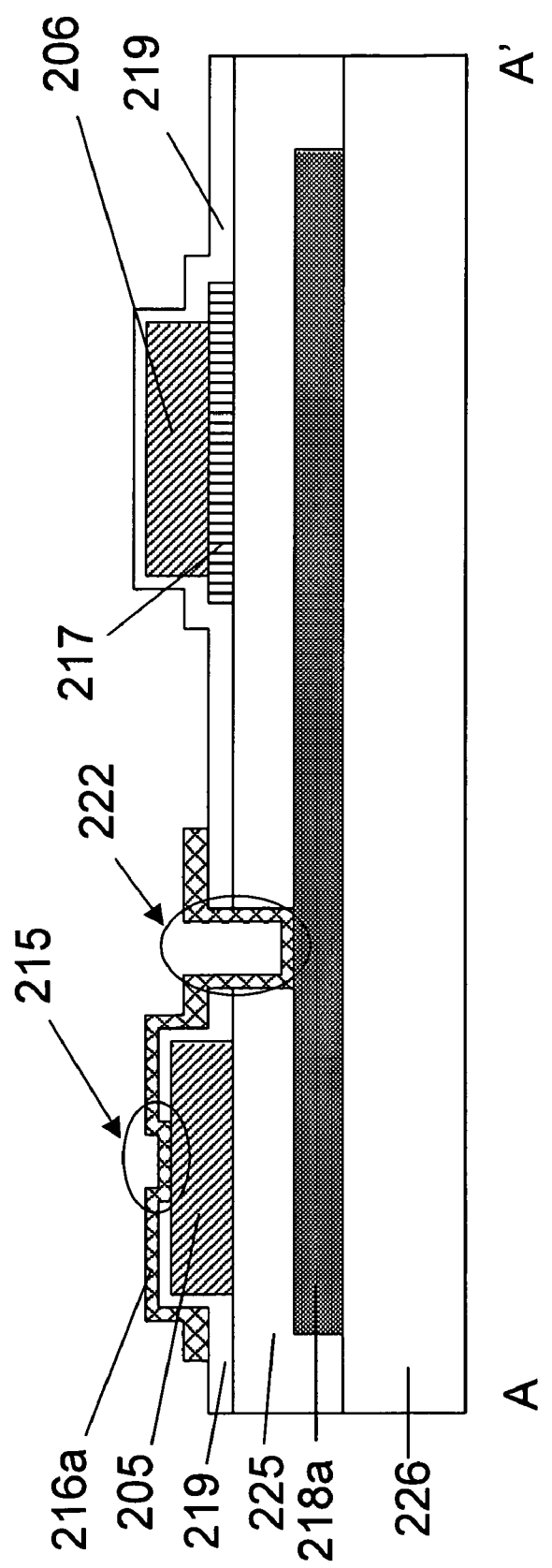
FIG. 8 is a sectional view of the region shown in FIG. 7 taken along the line A-A'.

FIG. 7 is an enlarged view showing the region 214a of the array substrate 201a in FIG. 6. For the sake of clarity, FIG. 7 does not show a passivation layer and a gate electrode insulating layer (their positions are shown in FIG. 8), both of which provide insulation between the respective layers in the array substrate. As shown in FIG. 7, reference numbers 215, 222, 223 and 224 denote contact holes; 217 denotes a semiconductor layer; and 216a denotes a transparent conductive electrode the material of which may be a transparent conductive oxide such as ITO and the like. During the stage of testing the data lines of the array substrate 201b with the shorting bars 205 and 206 of the array substrate 201a in FIG. 6, the shorting bar 205 is brought into electrical connection with an end portion 218a of the odd indexed data line 211a of the array substrate 201b via the contact holes 215 and 222, and the shorting bar 206 is brought into electrical connection with an end portion 218b of the even indexed data line 211b of the array substrate 201b via the contact holes 223 and 224. The end portions 218a and 218b of the odd and even indexed data lines 211a and 211b of the array substrate 201b extend into the area of the array substrate 201a, and particularly in the following manner.

FIG. 8 is a sectional view of the region shown in FIG. 7 taken along the line A-A'. As shown in FIG. 8, the end portion 218a of the odd indexed data line 211a is positioned on a glass substrate 226. A gate electrode insulating layer 225 lies over the end portion 218a of the odd indexed data line 211a and the glass substrate 226. Shorting bars 205 and 206, a passivation layer 219 and a transparent conductive electrode 216a are provided in this order on the gate electrode insulating layer 225. A semiconductor layer 217 is provided between the shorting bar 206 and the gate electrode insulating layer 225. The contact holes 215 and 222 are provided on the shorting bar 205 and the end portion 218a of the odd indexed data line 211a. In this way, the transparent conductive electrode 216a is electrically connected with the shorting bar 205 and the end portion 218a of the odd indexed data line 211a via the contact holes 215 and 222 respectively. That is, the shorting bar 205 and the end portion 218a of the odd indexed data line 211a are electrically connected with each other via the transparent conductive electrode 216a. With such structure, all the odd indexed data lines 211a of the array substrate 201b have the ends 218a thereof electrically connected to the shorting bar 205. Similarly, all the even indexed data lines 211b of the array substrate 201b have the ends 218b thereof electrically connected to the shorting bar 206 with an analogous structure. Thus all the data lines of the array substrate 201b can be tested by using the shorting bars 205 and 206 of the array substrate 201a.

According to an embodiment of the invention, the array substrates can be produced with the following method. First, a mother glass is provided including a plurality of array substrates such as the array substrates 201a and 201b in which at least the array substrate 201a comprises the display region 209 and the non-display region as well as a plurality of data lines and scan lines as described above, and comprises the common electrode bus 207, the shorting bars 205, 206 in the non-display region. Subsequently, the data lines of the array substrate 201b are tested by using the shorting bars of the array substrate 201a. After the test, commonly known processes on the respective array substrates and the corresponding color filter substrates, such as bonding and sealing, can be carried out, and the array substrates 201a and 201b can be cut off from the mother glass and so on.

After the mother glass is cut along the cutting line L, the shorting bars 205 and 206 of the array substrate 201a are not connected with the data lines of the array substrate 201b any longer, but kept in a floating state without the functionality of test. Then, a liquid crystal display can be completed with other known subsequent processes such as the addition of driving modules. According to embodiments of the invention, in the cutting process above, only the shorting bars 203 and 204 are cut off from the mother glass, while the shorting bars 205 and 206 are not cut off from the array substrates 201a and 201b. In this case, shorting bars 205 and 206 may be further utilized as two common electrode buses in the following manner.

Figure 9:
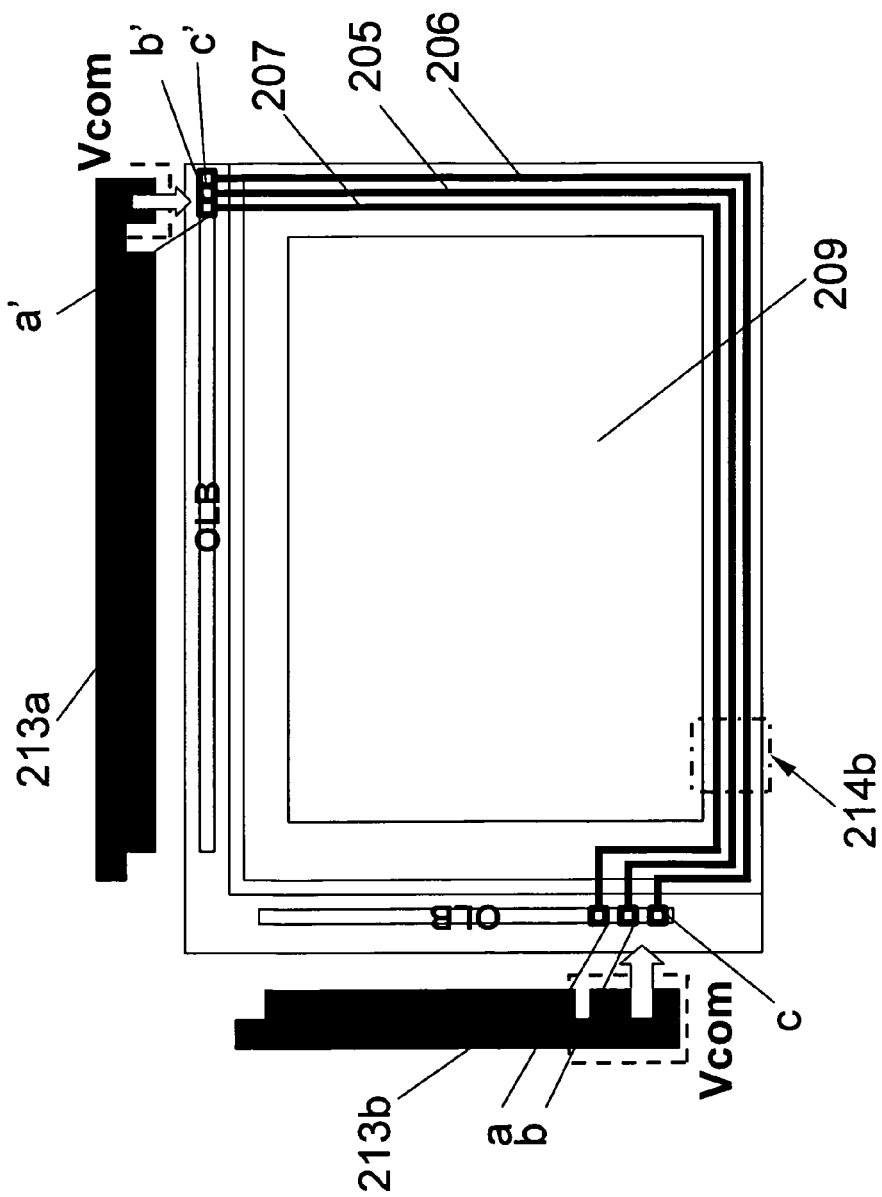
FIG. 9 is a plan view showing the array substrate 201a which has been assembled with a color filter substrate.

FIG. 9 is a plan view showing the array substrate 201a which has been assembled with a color filter substrate. As shown in FIG. 9, the reference number 213a denotes a data line driving module, 213b denotes a scan line driving module, a and a' show the contact points at the both ends of the common electrode bus 207, b and b' show the both ends of the shorting bar 205, and c and c' show the both ends of the shorting bar 206. In displaying images, the data line driving module 213a and the scan line driving module 213b provide a common voltage signal Vcom and send the same across the contact points a, b, c and a', b', c', in addition to providing the corresponding driving signals for the data lines and the scan lines. Meanwhile, the shorting bars 205 and 206 can be regarded as two common electrode buses, the operation of which will be described hereafter with reference to FIG. 11. In addition, the voltages across the shorting bars 205 and 206 are Vcom and identical to that across the common electrode bus 207. Thus the shorting bars 205, 206 and the common electrode bus 207 are in a parallel state, and have a total resistance less than the resistance of any one of them. In this way, the increase of the resistance of the common electrode bus 207 due to being thinned can be solved with such a parallel connection. The inventors have recognized from the results of a number of simulations that as the value of the resistance of the common electrode bus decreases, images displayed are advantageously more stable.

In an embodiment of the invention, the common electrode bus and the shorting bars 205, 206 can be provided beneath a sealant which is provided in a sealing region within the non-display region of the array substrate for forming a liquid crystal display by bonding and sealing the array substrate and a color filter substrate.

Figure 10:
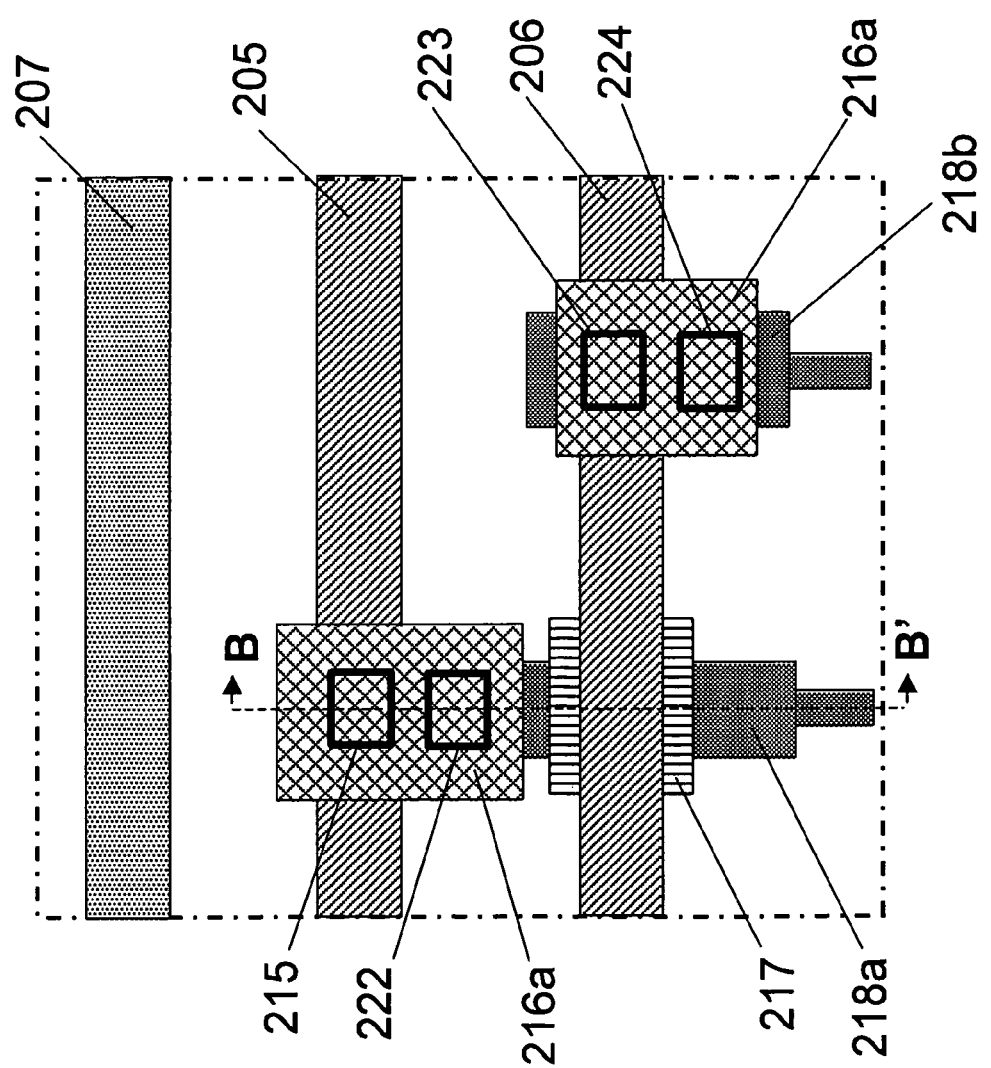
FIG. 10 is an enlarged view showing the region 214b in FIG. 9.

FIG. 10 is an enlarged view showing the region 214b in FIG. 9. The structure in FIG. 10 is similar to that in FIG. 7 and differs from it in that the array substrate 201a has been assembled with the color filter substrate into a finished liquid crystal display, and the shorting bars 205, 206 having been cut are in a floating state.

Figure 11:
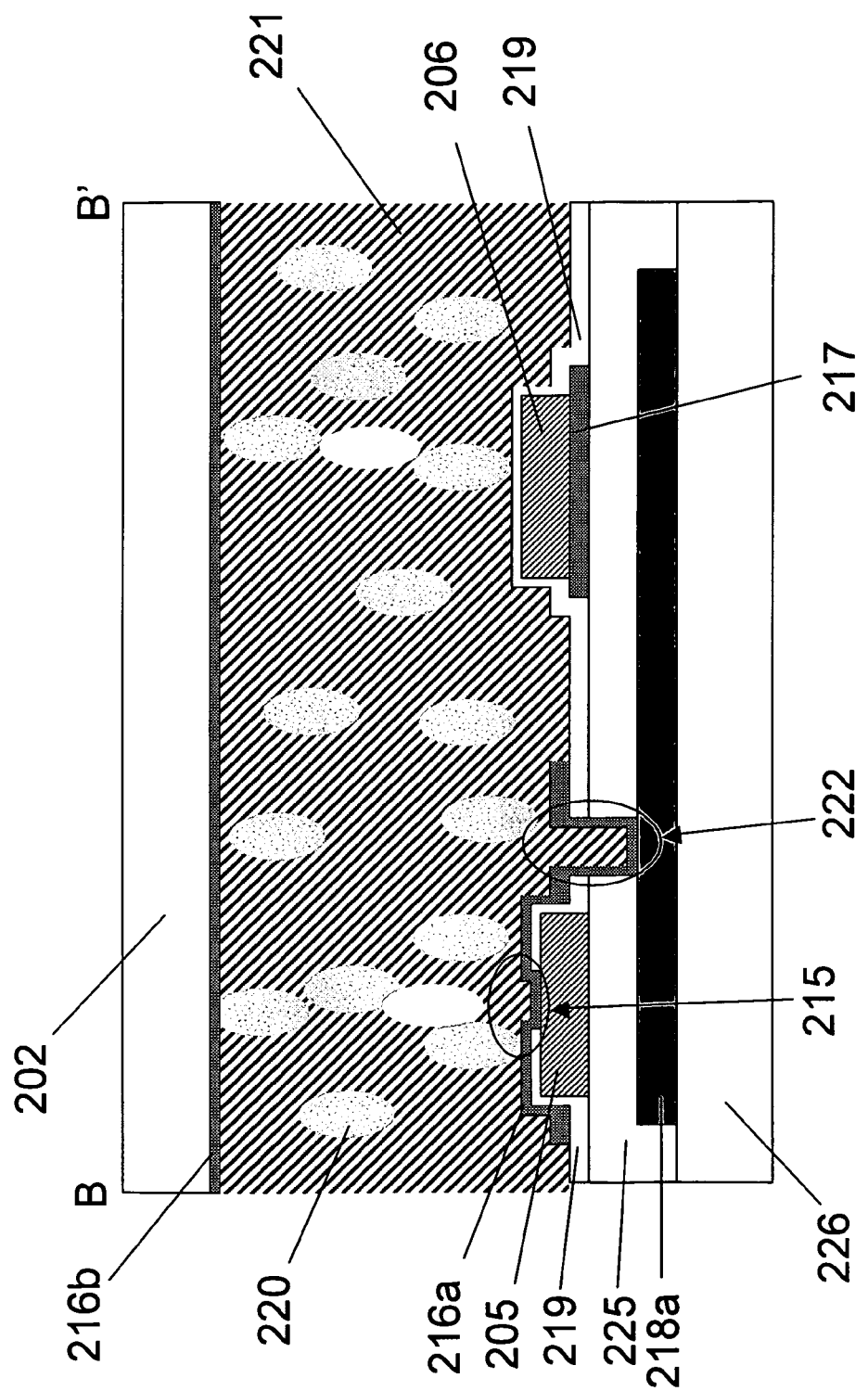
FIG. 11 is a sectional view taken along the B-B' line in FIG. 10.

FIG. 11 is a sectional view taken along the B-B' line in FIG. 10. As shown in FIG. 11, a sealant 221 is provided between the array substrate and the color filter substrate 202, and contains some electrically conductive balls 220 therein. In the present invention, the electrically conductive balls 220 employ metal balls, such as golden balls (Au balls). However, other conductive material may also be employed. With the array substrate and the color filer substrate assembled into a liquid crystal display as described above and during the operation of the liquid crystal display, when a common voltage signal Vcom is imputed to the shorting bar 205, the common voltage signal Vcom will be transmitted to the transparent conductive electrode 216a via the contact hole 215 through the passivation layer 219, and then to the common electrode 216b of the color filter substrate 202 via the electrically conductive balls 220 in the sealant 221, so that the transmission of the common voltage signal Vcom is achieved. Similarly, the common voltage signal in the shorting bar 206 is transmitted to the transparent conductive electrode 216a via the contact hole 223 through the passivation layer 219, and then to the common electrode 216b of the color filter substrate 202. The shorting bars 205 and 206 are also in electrical connection by the contact holes, the electrically conductive balls and the common electrode 216b of the color filter substrate. In the present embodiment, the common electrode bus 207 is provided in a layer different from that provided with the shorting bars 205 and 206. However, they may also be provided in the same layer. The common electrode bus 207 may also be provided with a contact hole and covered with a transparent conductive electrode, and thus electrically connected to the common electrode of the color filter substrate 202 via the electrically conductive balls and further to the shorting bars 205 and 206.

In the present embodiment, the manner in which the shorting bars are provided is merely exemplary. It is possible to provide a single shorting bar, or provide more shorting bars. For example, in the present embodiment, a conventional common electrode bus having a width of 2 mm is thinned to 1 mm in width, and two shorting bars each having a width of about 0.5 mm are provided in the saved space. However, the space may be provided with only one shorting bar having a width of about 1 mm, or be provided with three shorting bars each having a width of about 0.3 mm, or the like. The width of the thinned common electrode bus may also be other values, such as 0.75 mm, 1.5 mm or the like. In addition, the driving modules in the present invention may be a printed circuit board or in another form such as Chip On Film (COF).

Although the invention has been described in detail in terms of embodiments with reference to the drawings, it should be noted that the above is illustrative instead of restrictive. Those skilled in the art may recognize various modifications and alternatives within the scope of the invention which is defined only by the appended claims instead of the specific embodiments described above.

What is claimed is:

1. An array substrate of a liquid crystal display, comprising:
   a plurality of scan lines;
   a plurality of data lines crossing with the plurality of scan lines; and
   a common electrode bus,
   wherein the array substrate further comprises a shorting bar which is in parallel connection with the common electrode bus during the operation of the liquid crystal display, and prior to the cutting of a mother glass from which a plurality of array substrates for liquid crystal displays are cut off, is electrically connected with the data lines or the scan lines of another array substrate abutting the array substrate in the mother glass.

2. The array substrate according to claim 1, wherein the common electrode bus has a width less than about 2 mm.

3. The array substrate according to claim 1, further comprising a display region and a non-display region outside the periphery of the display region, wherein the data lines and the scan lines cross with each other within the display region, and the shorting bar is positioned within the non-display region.

4. The array substrate according to claim 3, wherein the non-display region comprises a sealing region and the shorting bar is positioned within the sealing region.

5. The array substrate according to claim 1, wherein the shorting bar is provided with a plurality of contact holes covered with a transparent conductive electrode.

6. A liquid crystal display comprising an array substrate of claim 1, a color filter substrate and a sealant between the array substrate and the color filter substrate.

7. The liquid crystal display according to claim 6, wherein the common electrode bus has a width less than about 2 mm.

8. The liquid crystal display according to claim 6, wherein the array substrate further comprises a display region and a non-display region outside the periphery of the display region, wherein the data lines and the scan lines cross with each other within the display region and the shorting bar is positioned within the non-display region.

9. The liquid crystal display according to claim 8, wherein the sealant contacts the array substrate in a sealing region within the non-display region, and the shorting bar is positioned within the sealing region.

10. The liquid crystal display according to claim 9, wherein the sealant contains an electrically conductive material therein, and the shorting bar is connected with a common electrode on the color filter substrate via the electrically conductive material.

11. The liquid crystal display according to claim 6, wherein the shorting bar is provided with a plurality of contact holes covered with a transparent conductive electrode.

12. The liquid crystal display according to claim 6, wherein the common electrode bus is provided with a plurality of contact holes covered with a transparent conductive electrode.

13. A mother glass from which a plurality of array substrates of claim 1 for liquid crystal displays are cut off.

14. The mother glass according to claim 13, wherein the shorting bar is provided with a plurality of contact holes covered with a transparent conductive electrode.

15. The mother glass according to claim 13, wherein the common electrode bus is provided with a plurality of contact holes covered with a transparent conductive electrode.

16. The mother glass according to claim 14, wherein the common electrode bus is provided with a plurality of contact holes covered with a transparent conductive electrode.

17. The mother glass according to claim 13, wherein a lower side of the array substrate abuts an upper side of another array substrate.

18. The mother glass according to claim 13, wherein a right side of the array substrate abuts a left side of another array substrate.

19. The mother glass according to claim 13, wherein the plurality of array substrates are divided into several groups and each group comprises the array substrates abutting against each other.

* * * * *